June 14, 1927.
A. A. SERVA
1,632,512
PULLEY
Original Filed Sept. 23, 1922
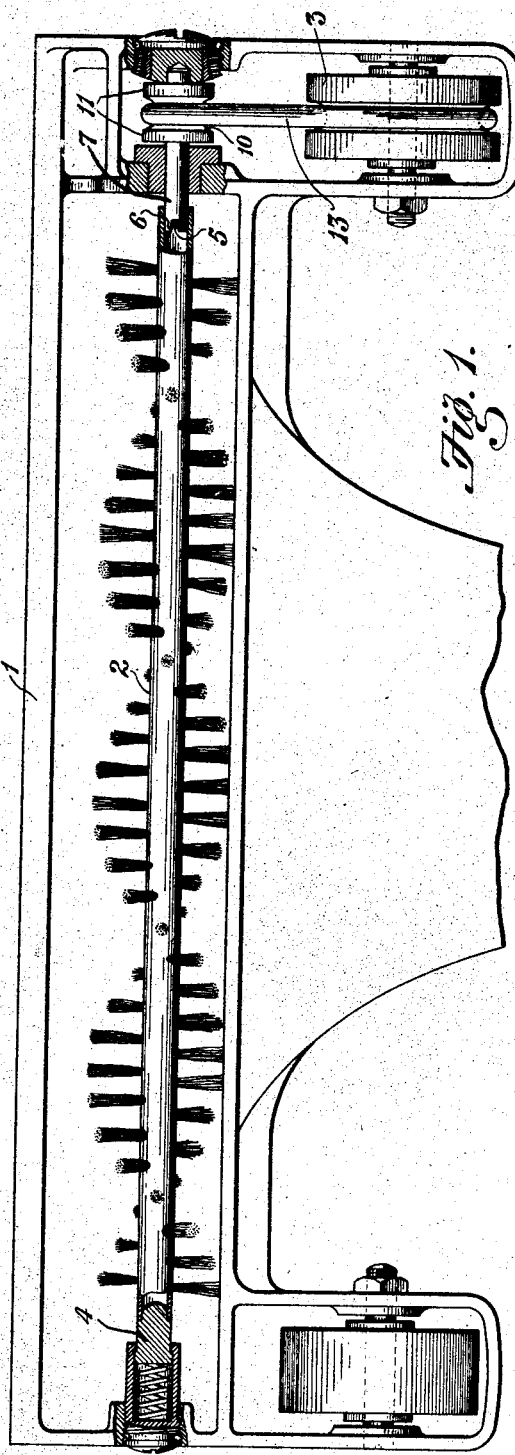
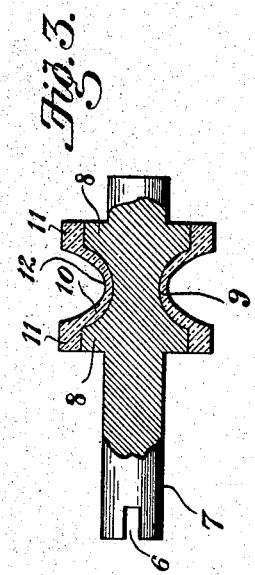
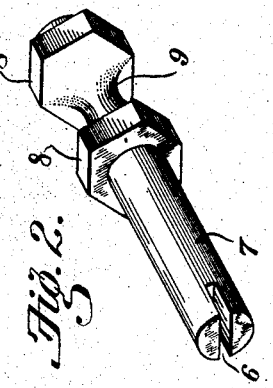
Inventor
A. A. Serva.
By Frease and Bond
Attorneys Patented June 14, 1927.

1,632,512

UNITED STATES PATENT OFFICE.

ADAM A. SERVA, OF CANTON, OHIO, ASSIGNOR TO THE UNITED ELECTRIC COMPANY, OF CANTON, OHIO, A CORPORATION OF OHIO.

PULLEY.

Original application filed September 23, 1922, Serial No. 590,113. Divided and this application filed November 3, 1923. Serial No. 672,625.

This invention relates to pulleys, especially adapted for connection with rotary brushes, such as are commonly used in vacuum cleaners; and the objects of the invention are to provide a pulley having a metal shaft and hub portion upon which is molded a pulley of hard rubber or the like.

The above and other objects may be attained by constructing the device in the manner illustrated in the accompanying drawing, in which—

Figure 1 is a bottom plan view of the nozzle portion of a vacuum cleaner and brush being provided with the improved pulley;

Fig. 2, a detached perspective view of the metal shaft and hub portion of the pulley; and Fig. 3, a longitudinal sectional view through the complete pulley.

Similar numerals of reference indicate corresponding parts throughout the several figures of the drawing.

For the purpose of illustrating the application of the improvements to a portable machine a vacuum cleaner of any usual type is illustrated provided with the elongated nozzle 1, in which is mounted a rotatable brush 2 arranged to be driven as by one of the wheels 3. The spindle of the brush 2 is preferably hollow, one end being journaled upon a spring pressed journal 4, the other end of the brush shaft having a transverse pin 5 which engages the slot 6 in the end of the pulley shaft 7.

The pulley shaft is preferably provided with the spaced integral hexagonal portions 8, connected by the reduced concaved neck portion 9. In forming the pulley upon the shaft this hexagonal portion of the shaft is placed in a mold and hard rubber or the like, as shown at 10, is molded around the same, forming a pulley rigid upon the shaft.

The hard rubber thus forms a pulley comprising the spaced, annular flanges 11, separated by the annular groove 12, which receives the belt 13 located around the wheel 3 for transmitting motion from said wheel to the pulley.

With this construction a cheap and durable pulley is provided, the shaft and body portion of the pulley being of metal, while the surface of the same is of hard rubber or similar friction material held rigidly upon the shaft by means of the hexagonal portions 8.

This application is a division of my copending application Serial No. 590,113, filed September 23, 1922.

I claim:

1. A metal shaft with an integral hexagonal portion thereon having a reduced neck substantially the same diameter as the shaft and a hard rubber pulley shell molded upon said hexagonal portion and reduced neck and conforming to the contour of the neck.

2. A metal shaft having spaced integral hexagonal portions thereon and a reduced grooved neck between said hexagonal portions, and a hard rubber pulley shell molded upon the hexagonal portions and reduced neck and conforming to the contour of the neck.

ADAM A. SERVA.